July 18, 1933.  C. H. DEDERICK ET AL  1,918,323
MULTISPEED SPLIT PHASE MOTOR
Filed March 7, 1931    3 Sheets-Sheet 3

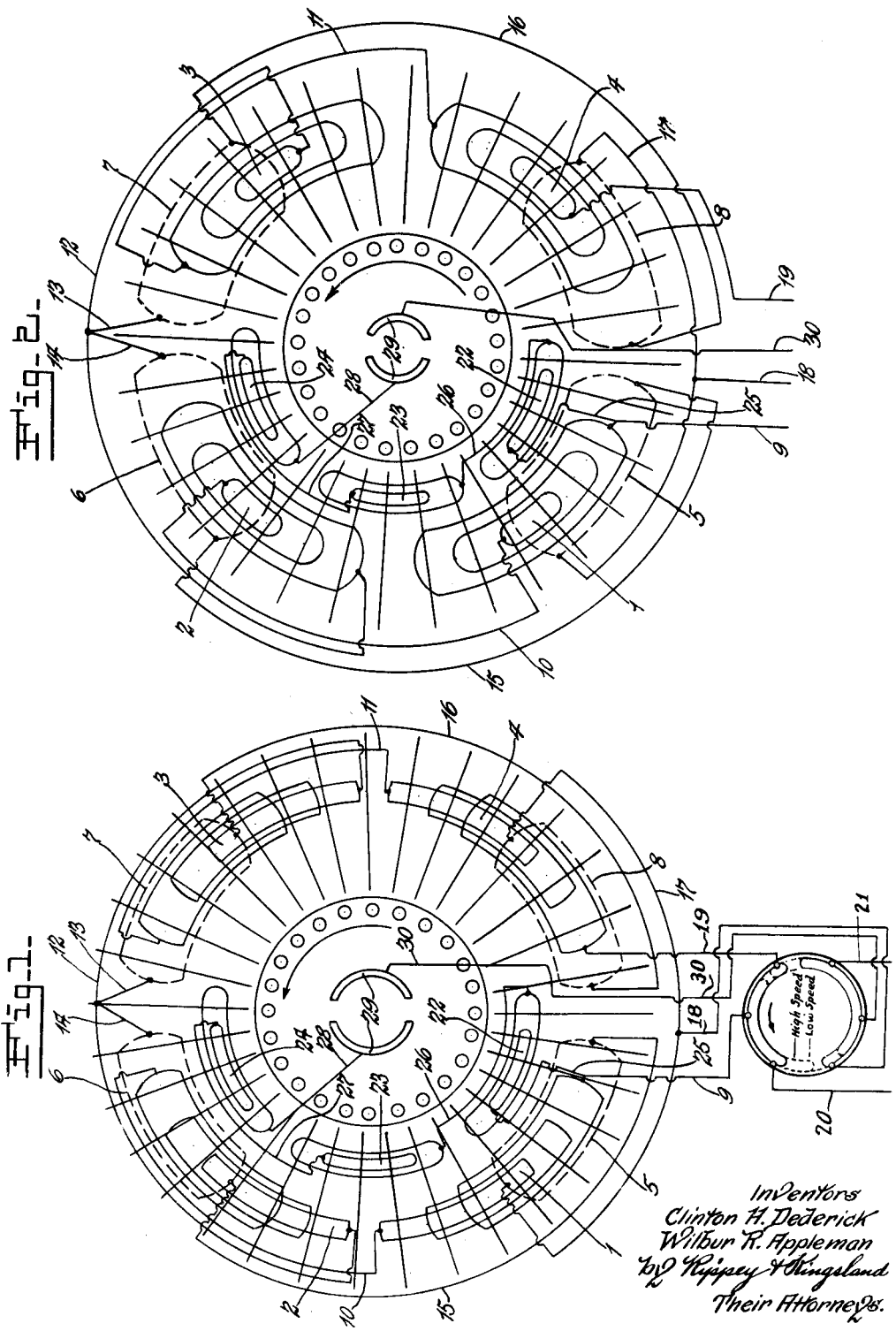

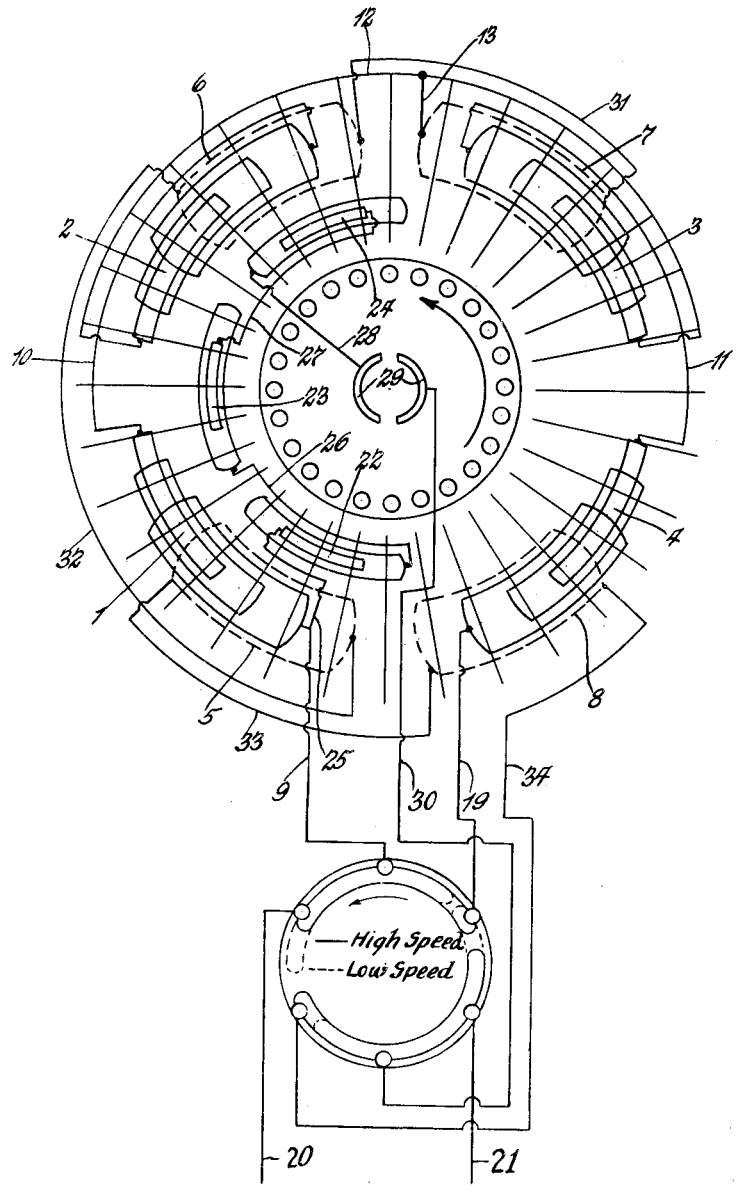

Inventors
Clinton H. Dederick
Wilbur R. Appleman
by Rippey & Kingsland
Their Attorneys.

Patented July 18, 1933

1,918,323

UNITED STATES PATENT OFFICE

CLINTON H. DEDERICK AND WILBUR R. APPLEMAN, OF ST. LOUIS, MISSOURI, ASSIGNORS TO THE EMERSON ELECTRIC MFG. CO., OF ST. LOUIS, MISSOURI, A CORPORATION OF MISSOURI

MULTISPEED SPLIT PHASE MOTOR

Application filed March 7, 1931. Serial No. 520,775.

This invention relates to alternating current induction motors.

One object of this invention is to provide an improved motor of the alternating current type that will have different speed characteristics when differently connected.

A further object of this invention is to provide an alternating current motor having windings and outside switch connections in order to produce two different numbers of poles and thus give two different speed characteristics.

Another object of this invention is to provide an improved motor of the alternating current type that will have two different numbers of poles selectively, the numbers of poles differing in each instance by two or multiples thereof.

Further objects will appear from the following detail description taken in connection with the accompanying drawings, in which—

Fig. 1 is a diagram of one embodiment of this invention.

Fig. 2 is a diagram of another embodiment of the invention differing from Fig. 1 in that Fig. 2 shows the use of pyramidal coils whereas Fig. 1 shows the use of lap coils.

Fig. 3 is a diagram of another embodiment of the invention.

Figure 4:
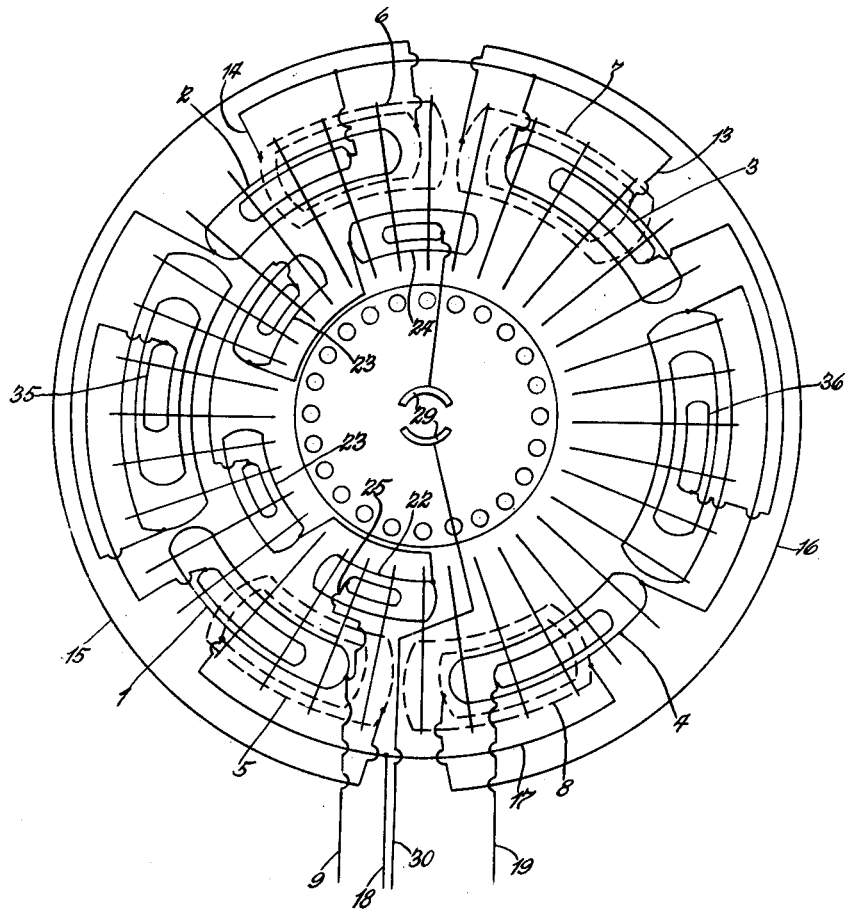
Fig. 4 is a supplementary diagram of another embodiment of the invention differing from the previous embodiments in that it shows a six-winding motor.

In the drawings and description, the invention is exemplified in a motor having four main windings, but it will be understood that this is merely illustrative, as the invention may be embodied in a motor having any number of main windings in multiples of two. In the drawings the main windings are illustrated as having pyramidal coils and lap coils, respectively, but it is to be understood that other types of windings may be used in the motor.

The motor consists of a frame with a wound field structure and a squirrel cage armature. Each of the embodiments illustrated and described has main primary windings of low ohmic resistance and phase displaced starting windings of high ohmic resistance. Each of the main primary windings consists of two separate windings, one which will hereafter be referred to as the main winding and the other as the auxiliary main winding. The main winding is effective during operation at either selected speed, but the auxiliary main winding is effective only during high speed operation. The starting windings, which are automatically cut out at a definite speed, will be referred to as phase windings.

The primary windings are arranged in such a manner that for high speed operation half of the primary windings are in series and adjacent, these in turn being in parallel with the other half of the primary windings which are also in series and adjacent. For high speed operation the constructions and connections are such that each winding is of a different polarity from its adjacent winding. In the embodiment as specifically shown in Figs. 1, 2 and 3, the motor will thus operate as a four pole machine. In the embodiment as specifically illustrated in Fig. 4, the motor will operate as a six pole machine. For low speed operation the main windings are all in series, but the auxiliary main windings are not in the circuit and are not effective; half of the adjacent poles of the main windings are reversed so that two pairs of adjacent windings now have the same polarity. Thus, two consequent poles are produced between the windings having like polarity and the motor will operate as a six pole machine where, as illustrated in Figs. 1, 2 and 3, there are four main windings, or the motor will operate as an eight pole machine where as shown in Fig. 4, there are six main windings.

The phase windings are displaced from the primary windings and arranged to give a starting torque at either speed. An automatic cut out mechanism is employed to open circuit the phase windings after the motor has reached a definite speed. As the construction and operation of the cut out mechanism are well known and as this invention is not concerned with the specific construction of such cut out mechanism, it is unnecessary to describe it in detail.

Since the motors illustrated in Figs. 1 and 2 differ only in the forms of the main windings, Fig. 1 illustrating the use of lap coils and Fig. 2 the use of pyramidal coils, one description will suffice for both embodiments and like reference numerals are used on the two figures to designate the same parts.

Main windings 1, 2, 3 and 4, and auxiliary main windings 5, 6, 7 and 8, shown in broken lines, are provided. Winding 1 has a lead 9 for connection to a power line and is connected by a wire 10 to winding 2, which is so constructed and connected as to have a polarity opposite that of winding 1. Windings 3 and 4 are connected by a wire 11 and are so constructed and connected as to have opposite polarities.

Windings 2 and 3 are connected by a wire 12. From the wire 12, wires 14 and 13 are connected, respectively, to the auxiliary main windings 6 and 7 which have the same polarity, respectively, as their corresponding main windings 2 and 3. A wire 15 connects auxiliary main windings 5 and 6, and a wire 16 connects auxiliary main windings 7 and 8. Auxiliary main windings 5 and 8 have the same polarity respectively as their corresponding main windings 1 and 4. Auxiliary main windings 5 and 8 are connected by a wire 17, which is also connected to a lead 18 for connection with a power line when the motor is to be operated as a four pole machine, or, as shown in Fig. 4, as a six pole machine. The main winding 4 is connected to a lead 19 for connection to either side of a power line, depending upon which speed characteristic of the motor is desired. For high speed it is connected to the same side of the power line as the lead 19 and for low speed it is connected opposite to the lead 9.

The two sides of the power line are designated 20 and 21, respectively. When the lead 9 is connected to line 20 and the lead 19 is connected to the line 21, the main windings 1, 2, 3 and 4 are in series, windings 2 and 3 are of the same polarity, and windings 1 and 4 are of the same polarity. Consequent poles will be produced between main windings 2 and 3, and between main windings 1 and 4, and thus the motor will operate as a six pole machine, or as an eight pole machine when wound as illustrated in Fig. 4. The voltages in the auxiliary main windings 5, 6, 7 and 8 are equal and opposite, and therefore are in effect no windings and at these places the consequent poles are produced.

When leads 9 and 19 are both connected to line 20 and lead 18 is connected to line 21, each winding will be of a polarity differing from that of its adjacent winding, and the motor will operate as a four pole machine, or as a six pole machine when wound as illustrated in Fig. 4.

Phase windings 22, 23 and 24 are provided. Winding 23 is displaced from the main windings at the conventional 90 electrical degrees, but windings 22 and 24 are displaced from the main windings differing from 90 degrees but to an extent as will produce a starting torque when acting in conjunction with their adjacent primary windings in the same direction for either speed. Phase winding 22 is connected by a wire 25 to the lead 9, windings 22 and 23 are connected together by a wire 26, windings 23 and 24 are connected together by a wire 27, and the winding 24 is connected through a wire 28 to an automatic cut-out 29. The cut-out 29 is connected to a lead 30, which is connected to the line 21 on both high and low speeds. The torque produced by the cooperation of the primary and phase windings when connected as described above is in the direction of the arrows shown on the rotor. By interchanging the wire 25 and lead 30 a starting torque may be produced in the opposite direction.

In the embodiment illustrated in Fig. 3, main windings 1, 2, 3 and 4, and phase windings 22, 23 and 24, with their connections, are the same is illustrated in the embodiment shown in Figs. 1 and 2. The difference between the embodiment shown in Fig. 3 and that shown in Fig. 1 is, that in the embodiment shown in Fig. 3 the auxiliary main windings 5, 6, 7 and 8 are all connected in series. The wire 12, which connects the main windings 2 and 3, is connected by the wire 13 to the auxiliary main winding 7. Auxiliary main winding 7 is connected to the winding 6 by a wire 31, the winding 6 is connected to winding 5 by a wire 32, and winding 5 is connected to winding 8 by a wire 33. Winding 8 is connected to a lead 34 which is adapted to be connected to the line 21 for high speed operation. Lead 34 is disconnected and no current flows through the auxiliary main windings on low speed operation. The auxiliary main windings, in this embodiment also, are so constructed and connected as to be of the same polarity as their respective main windings.

Fig. 4 illustrates an embodiment of the invention in a six winding machine which may be operated as either a six pole or an eight pole motor. The same description and switch diagrams applicable to the embodiment illustrated in Figs. 1 and 2 will suffice for the embodiment illustrated in Fig. 4. The same reference numerals are used where applicable.

A main winding 35 is situated between windings 1 and 2 and connected in series therewith in such a manner as to be of opposite polarity. Likewise, a winding 36 is connected between and in series with the windings 3 and 4. Two phase windings 23 are placed between the phase windings 22 and 24 where one winding 23 is used in the four winding machine illustrated in Fig. 1.

It will be obvious from the description that a motor is provided which may be operated by outside switch connections in such a manner as to have selectively two different speed characteristics, and which has phase windings effective to produce a starting torque whether the main windings are connected for low speed or high speed operation.

Parts of the invention may be used to advantage without the whole and various changes may be made in the details of construction, within the scope of the appended claims, without departing from the spirit of this invention.

We claim:

1. An alternating current induction motor including a plurality of main windings on the primary, said windings comprising groups of adjacent windings, the windings of each group being connected in series one with the other and differing in polarity, connections whereby certain groups may selectively be connected in series with the windings of the other groups in such a manner that the adjacent windings of the different groups have the same polarity, leads from a pair of wires constituting a source of current supply, and means for selectively changing the speed characteristics of the motor comprising means to disconnect one of the leads from its supply wire and connect it to the other supply wire and to connect such disconnected supply wire to a connection between said groups, whereby the groups of windings will be connected in parallel and each main winding will be of a polarity different from its adjacent winding.

2. An alternating current induction motor including a plurality of main windings on the primary, said windings comprising groups of adjacent windings, and windings of each group being connected in series one with the other and differing in polarity, connections whereby certain groups may selectively be connected in series with the windings of the other groups in such a manner that the adjacent windings of the different groups have the same polarity, leads from a pair of wires constituting a source of current supply, an auxiliary main winding lapping the adjacent main windings of different groups, means for selectively changing the speed characteristics of the motor comprising means to disconnect one of the leads from its supply wire and connect it to the other supply wire, and connections for connecting the auxiliary windings in circuit between the disconnected supply wire and a connection between the pairs of main windings.

3. An alternating current induction motor having a plurality of main windings with connections and switch mechanism for selectively reversing the polarity of groups of certain only of the main windings to change the number of poles, such groups consisting of adjacent windings and the windings of each group being alternately of different polarity.

4. An alternating current induction motor having a plurality of main windings arranged in groups of adjacent windings, the windings in each group being alternately of different polarity, with connections and switch mechanism for reversing the polarity of one half the groups of said main windings, thereby increasing or decreasing respectively the number of effective poles in the motor.

5. An alternating current induction motor having a plurality of groups of adjacent main windings, the windings in each group being alternately of different polarity, with connections and switch mechanism for reversing the polarity of certain of these groups of main windings, and starting windings displaced from the remaining groups of main windings arranged to produce a starting torque in the same direction in either relationship.

6. An alternating current induction motor having main windings, connections whereby at least one of the main windings differs in polarity from an adjacent winding, means for selectively changing the polarity of said one main winding whereby a consequent pole is produced between said adjacent windings, auxiliary windings lapping respectively said adjacent windings and displaced therefrom in the direction of the consequent pole, connections for maintaining said auxiliary windings in circuit when the said adjacent windings are connected to differ in polarity, and means for disabling said auxiliary windings when said adjacent main windings are connected to produce like polarity.

7. An alternating current induction motor having main windings, connections whereby at least one of the main windings differs in polarity from an adjacent winding, means for selectively changing the polarity of said one main winding whereby a consequent pole is produced between said adjacent windings, auxiliary windings lapping respectively said adjacent windings and displaced therefrom in the direction of the consequent pole, connections for maintaining said auxiliary windings in circuit when the said adjacent windings are connected to differ in polarity, and connections whereby said auxiliary windings are disabled upon the operation of said means to produce like polarity in said adjacent windings.

8. An alternating current induction motor having a plurality of main windings on the primary, connections whereby the windings are caused to differ alternately in polarity, means for selectively reversing the polarity of a group of certain adjacent windings whereby consequent poles are produced between two windings in the said group respectively and other adjacent windings, and auxiliary main windings lapping the main windings on each side of the position of the consequent pole and displaced from the windings respectively toward the position of the consequent pole.

9. An alternating current induction motor having a plurality of main windings arranged radially asymmetrical and in such a manner that when consequent poles are produced between some of the windings all of the poles are subsequently symmetrical, means for connecting said windings to have such polarity therein as will result in the consequent poles as aforesaid, selective connections to place the windings in alternate polarity thereby making the poles equal in number with the windings, and auxiliary windings adapted to be connected in circuit with the main windings displaced from the main windings and so arranged and connected as to make the resultant poles radially symmetrical when the main windings are connected with alternate polarity.

10. An alternating current induction motor having a plurality of main windings arranged in groups of adjacent windings in each of which the windings are series connected and with alternate polarity, and connections and switch mechanism for selectively reversing the polarity of one of said groups of main windings whereby in one relationship each main winding is of opposite polarity from its adjacent winding and in the other relationship the nearest windings are arranged in a plurality of groups with the adjacent windings of adjacent groups having the same polarity.

CLINTON H. DEDERICK.
WILBUR R. APPLEMAN.